United States Patent Office 2,755,096
Patented July 17, 1956

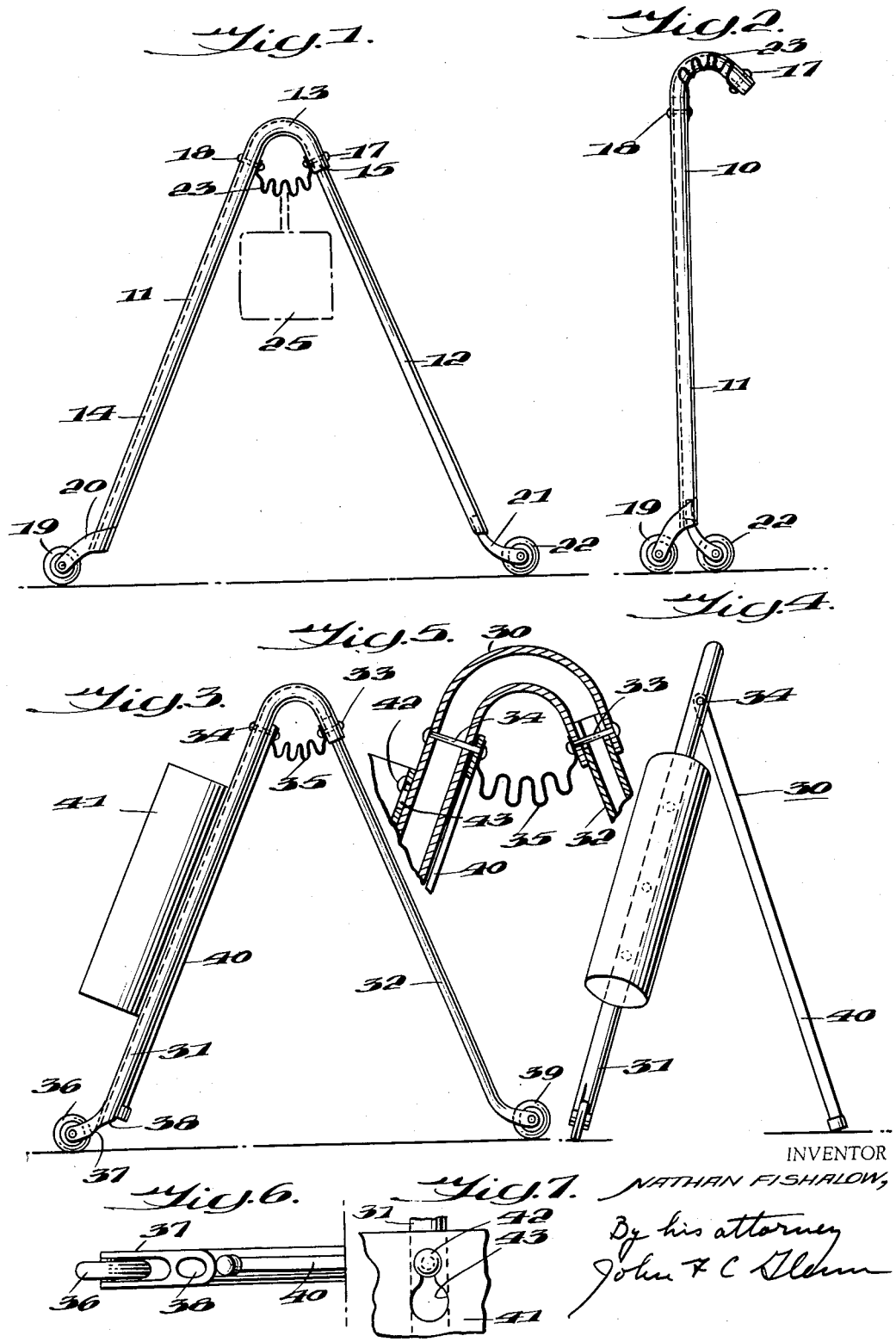

2,755,096

CONVERTIBLE WHEELED ARTICLE CARRIER

Nathan Fishalow, San Juan, Puerto Rico

Application September 1, 1954, Serial No. 453,452

10 Claims. (Cl. 280—36)

The invention relates to portable carriers which may be assembled for carrying packages during shopping, for example, and which may be converted readily into an inconspicuous and compact cane-like form when not in use as a carrier.

While convertible carriers have been attempted in the past, they have not sufficiently combined usefulness when opened as a carrier, compactness when closed between carrying operations, and ready convertibility between such operations.

Other advantages, objects and details of the invention will become apparent from the following detailed description of the present preferred embodiments of the invention which are shown for purposes of illustration only, in the accompanying drawings.

In the drawings:

Figure 1 is a side elevation of a convertible carrier embodying the invention, shown with its legs assembled for carrying purposes;

Figure 2 is a side elevation of the carrier shown in Figure 1, with its legs telescoped;

Figure 3 is a side elevation corresponding to Figure 1 but showing a modified form of carrier embodying the invention;

Figure 4 is an end elevation of the carrier shown in Figure 3, with the third leg swung out to form a self-supporting tripod;

Figure 5 is an enlarged sectional view of the upper portion of the carrier shown in Figure 3;

Figure 6 is an enlarged detailed bottom view, partially broken away, of the lower end of the carrier leg shown at the left of Figure 3; and Figure 7 is an enlarged detailed front view of the cannister attachment means shown in Figure 5.

The convertible carrier 10 illustrated in Figures 1 and 2 has a pair of tubular supporting legs 11 and 12. The leg 11 has a curved portion 13 integrally connecting a long straight length 14 and a short straight length 15. The leg 12 is entirely straight and has a smaller outside diameter than the inside diameter of the straight portions of the leg 11, so that one end of the leg 12 can be thrust into the short straight length 15 of the leg 11 to form an inverted V structure for carrying purposes (Figure 1) and substantially the whole length of the leg 12 can be thrust into the long straight length 14 of the leg 11 for purposes of telescoping the leg into the least space (Figure 2). The legs 11 and 12 are fastened together by a removable bolt 17 when they are in carrying position, and by a removable bolt 18 when they are telescoped together. To avoid the difficulty of removing the bolts 17 and 18 when the leg 12 is shifted, the upper end of the leg 12 is slotted to allow it to pass around the bolts 17 and 18, which are tightened or loosened to control the frictional grip of leg 11 on leg 12. The bolts 17 and 18 have heads integral with their shanks disposed on the outer side of the leg 11, and have removable nuts on the inside of the curve of the leg 11, the nuts being of the rounded-corner self-locking type. The lower end of leg 11 has a wheel 19 attached to it by means of a bracket 20 extending around the outside of and welded to the leg, so that the wheel 19 is offset out of the way of leg 12 when the latter is telescoped into leg 11. A bracket 21 is anchored inside the lower end of leg 12 to carry a wheel 22 in offset relation to leg 12. The inner ends of the bolts 17 and 18 hold opposite ends of a stiff wire 23 which has a series of sinusoidal curves in its midportion to provide fingers for hooking packages 25 or the like on the carrier 10. When the leg 12 is telescoped into leg 11 the wire 23 is swung outwardly about the bolts 17 and 18 and thence up into a position where it fits closely along the curved portion 13 of the leg 11.

When the carrier 10 has a package 25 hooked on its wire 23 (Figure 1) it may be grasped by the curved central portion 13 and can readily be rolled along on its wheels 19 and 22. The tubular curved portion 13 provides a good handle by which to grasp the carrier to hold it upright and to push it along, or to lift it for purposes of changing its direction or to carry it over obstructions such as steps. The narrow width of the carrier makes it particularly easy to maneuver through crowded places. When the legs 11 and 12 are telescoped together, as shown in Figure 2, and the wire 23 is swung up against the curved portion 13 of the leg 11, the result is a cane-like structure which is easy to carry and store, and which can be grasped or hung up readily by means of the curved tubular portion 13. It can also be leaned against a wall without difficulty because the wheels 19 and 22 are spaced sufficiently far apart for that purpose even when the legs are telescoped. The wheels 19 and 22 are preferably rubber-tired, to reduce noise and to give a good frictional grip on the floor when the carrier or the telescoped cane is leaned against a wall.

Another embodiment of the invention is illustrated in Figures 36, which show a convertible carrier 30 having a pair of tubular legs 31 and 32, bolts 33 and 34, and wire 35 corresponding to the legs 11 and 12, bolts 17 and 18, and wire 23 of the carrier 10 described above. However, the lower end of the leg 31 is bent outwardly to journal its wheel 36 without any intermediate supporting bracket. This is accomplished by bending the tube of the leg 31 where the wheel is to be attached, by cutting through the end of the tube to form an integral fork 37 in which the wheel is mounted, and by drilling through the bottom of the curved end to form opening 38 through which the other leg 32 may telescope up into the straight portion of the leg 31. The lower end of the leg 32 is similarly forked to journal its wheel 39.

The carrier 30 also has a rod 40 pivotally connected at its upper end to the leg 31 by means of the bolt 34. The rod 40 extends not quite to bottom of the leg 31, and lies flat against the leg 31 when the carrier is travelling and when the legs are telescoped together. However, when it is desired to make the carrier self-supporting, the rod 40 is swung on the bolt 34 out of the plane of the legs 31 and 32 (in either direction), and the legs are then allowed to tilt toward the rod 40 until the lower end of the rod 40, which is preferably rubber-tipped, touches the ground (Figure 4). The carrier 30 then becomes a self-supporting tripod, with the weight of any article hanging from the wire 35 suspended in the space generally between the legs 31 and 32 and the supporting rod 40. The rod 40 could also be applied to the carrier 10 shown in Figures 1 and 2.

Figures 3–5 and 7 illustrate a metal cannister 41 detachably hooked on the front of leg 31 of the carrier 30. The cannister 41 has an open top for receiving articles to be transported on the carrier. In the example shown, a series of round-headed pins 42 are spaced along and project integrally from the leg 31, and are adapted to pass through the enlarged lower ends of corresponding slots 43 in the cannister 41. The slots 43 are of inverted key-hole shape, so that after the heads of the pins 42 pass through the enlarged lower ends of slots 43 the cannister drops down a little and locks in place, with the pin heads overlapping the narrow upper ends of slots 43. The cannister can be removed readily by lifting it slightly and then pulling it away from the leg 31. The cannister can be of any desired size and is equally applicable to the carrier 10 shown in Figures 1 and 2.

While I have illustrated and described present preferred embodiments of the invention, it will be recognized that the invention is not limited thereto but may be otherwise variously embodied and practiced within the scope of the following claims.

I claim:

1. A convertible carrier comprising a pair of supporting legs, means for detachably connecting the legs in the form of an inverted V, and a wheel carried at the lower end of each leg to provide rolling support for the inverted V structure, one of the legs having a hollow interior adapted to receive most of the length of the other leg when the latter is detached from the said connecting means.

2. A convertible carrier comprising a rigid structure with two disconnectible major sections adapted to be assembled in the general form of an inverted V and telescoped into the general form of an inverted J, the first section having a straight length adapted to form most of the length of one side of the V, and the second section having a tubular straight section adapted to form the other side of the V and open at its lower end to receive therein the first section when they are telescoped together, the second section also having a curved length terminating in a short straight tubular length adapted to receive the upper end of the first section when the two sections are assembled as an inverted V, and a wheel carried on the lower end of each of the sections in offset relation to the central axis of the section.

3. A convertible carrier comprising a pair of supporting legs, means for detachably connecting the legs in the form of an inverted V, a wheel carried at the lower end of each leg to provide rolling support for the inverted V structure, one of the legs having a hollow interior adapted to receive most of the length of the other leg when the latter is attached or detached from the said connecting means, and a third leg pivotally connected at its upper end to said one leg to swing from a position along said one leg to a position out of the plane of the V structure, said third leg being effective when in the latter position to cooperate with the first two legs in forming a supporting tripod.

4. A convertible carrier comprising a pair of supporting legs, means for detachably connecting the legs in the form of an inverted V, a wheel carried at the lower end of each leg to provide rolling support for the inverted V structure, one of the legs having a hollow interior adapted to receive most of the length of the other leg when the latter is attached or detached from the said connecting means and a container detachably secured to the said one leg.

5. A convertible carrier comprising a pair of supporting legs, means for detachably connecting the legs in the form of an inverted V, a wheel carried at the lower end of each leg to provide rolling support for the inverted V structure, one of the legs having a hollow interior adapted to receive most of the length of the other leg when the latter is attached or detached from the said connecting means and a wire secured at its opposite ends to opposite sides of the V structure adjacent its apex, the intermediate portion of the wire being curved to form hooks for suspending articles between the supporting legs.

6. A convertible carrier comprising a pair of supporting legs, means for detachably connecting the legs in the form of an inverted V, a wheel carried at the lower end of each leg to provide rolling support for the inverted V structure, one of the legs having a hollow interior adapted to receive most of the length of the other leg when the latter is attached or detached from the said connecting means and a wire pivotally connected at its opposite ends to opposite sides of the V structure adjacent its apex, the intermediate portion of the wire being curved to form hooks for suspending articles between the supporting legs when pivoted to one position, and being shaped to lie closely against the apex of the V when pivoted to another position.

7. A convertible carrier comprising a rigid structure with two disconnectable major sections adapted to be assembled in the general form of an inverted V and to be telescoped into the general form of an inverted J, the first section having a straight length adapted to form most of the length of one side of the V, and the second section having a tubular straight section adapted to form the other side of the V and open at its lower end to receive therein the first section when they are telescoped together, the second section also having a curved length terminating in a short straight tubular length adapted to receive the upper end of the first section when the two sections are assembled as an inverted V and a wheel carried on the lower end of each of the sections in offset relation to the central axis of the sections, said lower end of the second section being curved with an opening in the latter curved portion through which the first section is inserted to telescope the two sections together, and said lower end of the second section being bifurcated at its extreme end to receive the wheel between the bifurcated portions.

8. A convertible carrier comprising a rigid structure with two disconnectable major sections adapted to be assembled in the general form of an inverted V and to be telescoped into the general form of an inverted J, the first section having a straight length adapted to form most of the length of one side of the V, and the second section having a tubular straight section adapted to form the other side of the V and open at its lower end to receive therein the first section when they are telescoped together, the second section also having a curved length terminating in a short straight tubular length adapted to receive the upper end of the first section when the two sections are assembled as an inverted V, a wheel carried on the lower end of each of the sections in offset relation to the central axis of the sections and a pair of bolts extending through the said second section immediately below the opposite ends of its curved portion, for tightening the second section around the first section in their respective assembled and telescoped positions.

9. A convertible carrier comprising a rigid structure with two disconnectable major sections adapted to be assembled in the general form of an inverted V and to be telescoped into the general form of an inverted J, the first section having a straight length adapted to form most of the length of one side of the V and the second section having a tubular straight section adapted to form the other side of the V and open at its lower end to receive therein the first section when they are telescoped together, the second section also having a curved length terminating in a short straight tubular length adapted to receive the upper end of the first section when the two sections are assembled as an inverted V, a wheel carried on the lower end of each of the sections in offset relation to the central axis of the sections, a pair of bolts extending through the said second section immediately below the opposite ends of its curved portion, for tightening the second section around the first section in their respective assembled and telescoped positions, said bolts lying in the plane of the V structure and each having an exterior projecting head on the inside of the apex of the V, and a wire secured at its opposite ends to said bolt heads, said wire being formed into supporting hooks along its intermediate portion.

10. A convertible carrier comprising a rigid structure with two disconnectable major sections adapted to be assembled in the general form of an inverted V and to be telescoped into the general form of an inverted J, the first section having a straight length adapted to form most of the length of one side of the V and the second section having a tubular straight section adapted to form the other side of the V and open at its lower end to receive therein the first section when they are telescoped together, the second section also having a curved length terminating in a short straight tubular length adapted to receive the upper end of the first section when the two sections are assembled as an inverted V, a wheel carried on the lower end of each of the sections in offset relation to the central axis of the sections, and a leg pivotally connected at its upper end to the said second section and adapted in one position to lie along the straight length of the second section between its curved portions and its wheels, and to swing out of the plane of the inverted V structure to form therewith a self-supporting tripod.

References Cited in the file of this patent

UNITED STATES PATENTS 1,679,267    Rieger _____ July 31, 1928

FOREIGN PATENTS 858,843    France _____ Dec. 4, 1940